United States Patent
Stedman

[11] 3,943,793
[45] Mar. 16, 1976

[54] COLLAPSIBLE STEERING WHEEL COLUMN

[75] Inventor: Robert N. Stedman, Chillicothe, Ill.

[73] Assignee: Caterpillar Tractor Co., Peoria, Ill.

[22] Filed: Nov. 15, 1974

[21] Appl. No.: 524,114

[52] U.S. Cl. .................................. 74/492; 188/1 B
[51] Int. Cl.² .................................. B62D 1/18
[58] Field of Search ........ 74/492, 493; 188/1 B, 1 C

[56] References Cited
UNITED STATES PATENTS

| | | | |
|---|---|---|---|
| 2,179,959 | 11/1939 | Schroedter | 188/1 B X |
| 2,189,870 | 2/1940 | Sluyter | 188/1 B X |
| 2,639,626 | 5/1953 | Snyder | 74/493 |
| 2,819,063 | 1/1958 | Neidhart | 188/1 B X |
| 3,483,768 | 12/1969 | Glass | 74/492 |
| 3,583,530 | 6/1971 | DeVenne | 188/1 B |
| 3,699,824 | 10/1972 | Staudenmayer | 74/492 |
| 3,744,338 | 7/1973 | Komatsu et al. | 74/492 |
| 3,776,062 | 12/1973 | Ito | 74/492 |
| 3,798,994 | 3/1974 | Hollins | 74/492 |

*Primary Examiner*—Allan D. Hermann
*Attorney, Agent, or Firm*—Ralph E. Walters

[57] ABSTRACT

A collapsible steering wheel column of the resettable type for motor vehicles that progressively absorbs the energy of an operator's body which is thrust upon the steering wheel in an accident or crash. The steering column includes two longitudinally extending and telescopically slidable coacting members. The members are held in a normal operating position by a resilient torus between their interface and are rotatably coupled to each other. The torus is set in a radially inwardly facing annular recess of the outer member while the inner circumference of the torus is received in an opposing radially outwardly facing annular recess of the inner member to maintain a normal operating position until a disengaging impact force occurs. The outer member carries a shock-absorbing resilient pad with a central bore that is axially and radially engaged by a tapered conical portion on the other member upon telescoping movement. The pad progressively cushions and absorbs the energy from the impact upon the steering wheel. The column is resettable to its normal operating position by pulling apart the telescopically slidable coacting members so that the inner circumference of the resilient torus is compressed back into the annular recess of the inner member.

7 Claims, 6 Drawing Figures

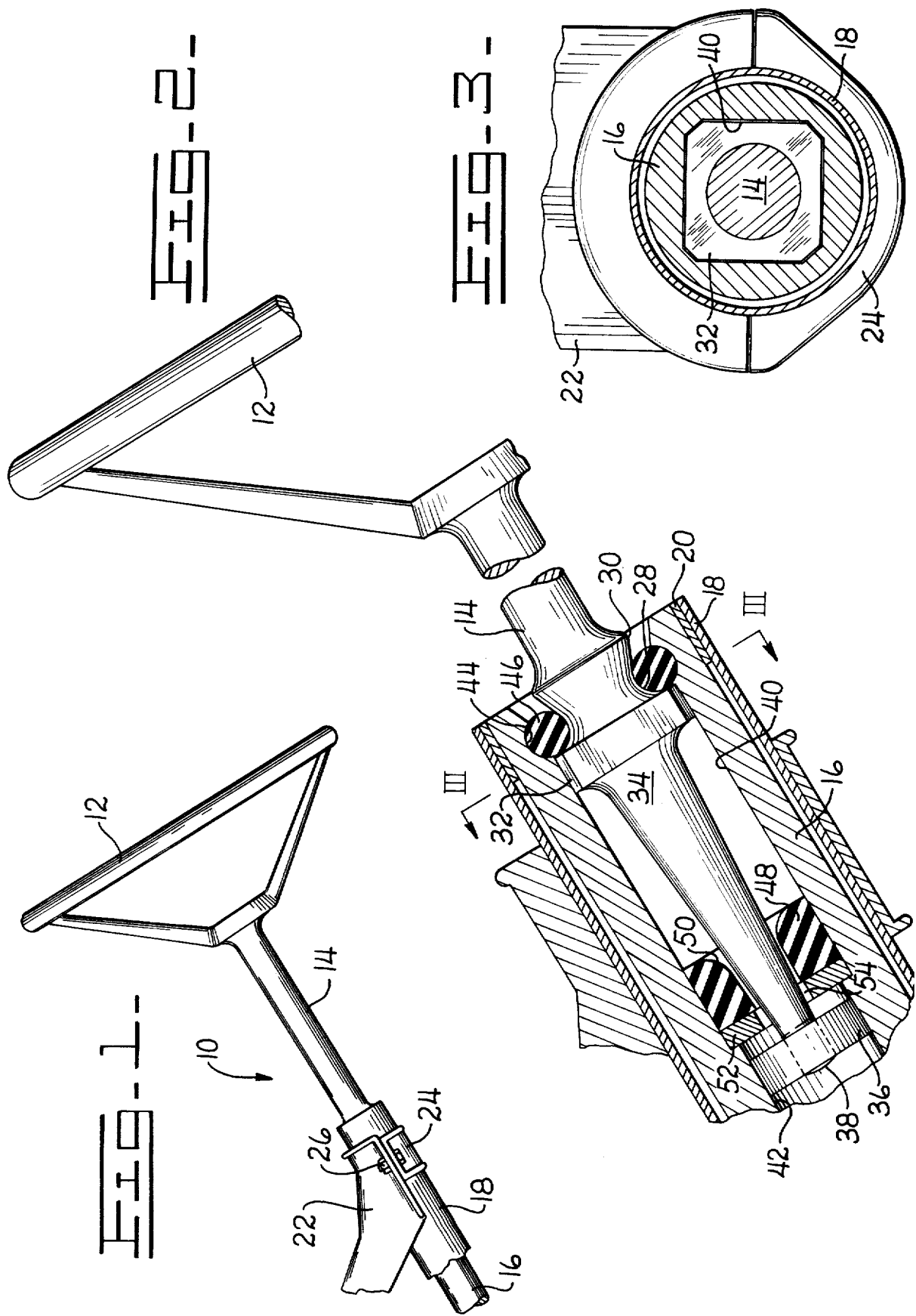

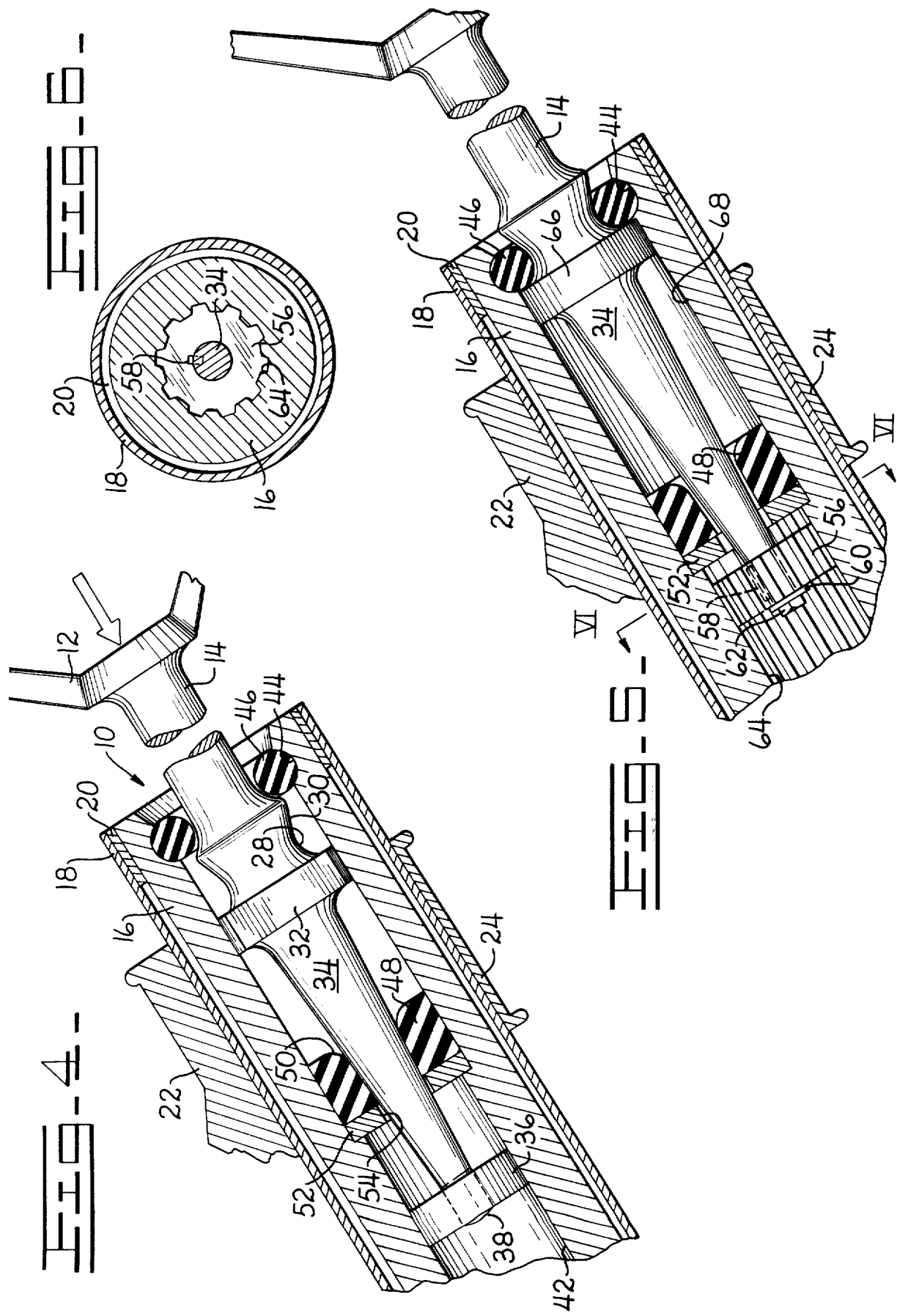

COLLAPSIBLE STEERING WHEEL COLUMN

BACKGROUND OF THE INVENTION

This invention relates to collapsible steering wheel columns of the resettable type for motor vehicles.

Pertinent prior art includes the following U.S. Patents: Fergle U.S. Pat. No. 3,487,710; Weiss, U.S. Pat. No. 3,540,304; Olsen U.S. Pat. No. 3,678,777 and Hollins U.S. Pat. No. 3,798,994.

In accordance with one prior art device, it is proposed that one of the shafts of a steering column on a motor vehicle either telescope outwardly or collapse inwardly by the activation of an explosive charge during the initial stages of a serious crash or accident. In a sub-critical crash, the force would be insufficient to activate the explosive charge but the shafts would still telescope one into the other to absorb the energy from the impact force of operator movement into the steering wheel. Obviously, this arrangement is very complex and requires replacement parts after each crash before the steering wheel column can be used again. Although this construction might be suitable for some automobile applications, it is hardly applicable for construction equipment which often requires the vehicle to be put back into operation shortly after the accident or crash.

Still other proposals include the provisions of tubular members between the steering wheel and the support brackets of the column. Such members are designed to absorb energy by controlled deformation of the member when an impact load is exerted against the steering wheel. Besides various other limitations, these steering wheel columns are not resettable without new parts after an accident.

Another proposal employs a padded cushion between the steering wheel and the instrument panel of the vehicle. The steering wheel column is comprised of telescoping members that are held in a fixed operating position by gripping spring fingers until the fingers are forced out of their respective indentations by the operator being thrust against the steering wheel which results in the steering wheel collapsing toward the padded cushion. The cushion is expected to absorb the energy from the impact and to protect the driver from injury. In practice, however, the fingers of an operator could easily be pinched between the steering wheel and the cushion in a crash. Moreover, because there is a rigid support member beneath the cushion which limits the energy absorption abilities of the cushion, there may be inadequate absorption of the impact force in case of a serious crash.

SUMMARY OF THE INVENTION

It is a primary object of the present invention to provide a collapsible steering wheel column for protecting the operators of motor vehicles and construction equipment from serious injury in the event of being thrust against the steering wheel in an accident or crash.

Another object and feature of this invention is to provide a steering wheel column in which the energy of the impact is absorbed by the progressive compression of a resilient pad within the column by a compacting means carried by the column member, which telescopes into the other member.

A further object and feature of this invention is to provide a collapsible steering wheel column for motor vehicles which is immediately resettable after an accident to its original operating position without the requirement of new parts or tools.

A still further object and feature of this invention is to provide a safety steering wheel column of the resettable type which is readily adaptable for use on construction equipment.

In accordance with the presently preferred embodiment of this invention, an energy-absorbing steering column of the resettable type includes two longitudinally extending telescopically slidable coacting members which are supported and enclosed within a tubular housing for rotation therein. One is a rotatable lower coacting tubular member and the other is a rotatable upper coacting tubular member which is constructed with a radially outwardly facing annular recess including a ramp surface and a tapered conical lower portion which are partially disposed within the lower coacting member. The upper coacting member also includes a means extending radially outwardly into engagement with the lower coacting member for longitudinally stabilizing the telescopically slidable movement and for providing a rotary drive connection between the coacting members. The lower coacting member includes a radially inwardly facing annular recess opposite the recess in the upper coacting member. A resilient torus is disposed in both recesses for retaining the coacting members in a fixed axial disposition with respect to one another until the application of a disengaging impact force upon the steering wheel attached to the upper coacting members. A shock-absorbing resilient pad with a backing plate is carried within the lower coacting member. This pad is progressively compressed both axially and radially by the tapered conical lower portion of the upper coacting member which passes through a central opening in the pad and comes into contact with the sides of the central opening. Thus, the coacting members telescopically collapse one into the other during an impact load such as the operator's body being thrust upon the steering wheel during a crash or accident.

Other objects and advantages of the invention will become apparent upon reading the following detailed description and upon reference to the drawings.

BRIEF DESCRIPTION OF THE DRAWINGS

FIG. 1 is a side elevation of one embodiment of the invention showing a steering wheel, coacting members of the steering column, and housing brackets;

FIG. 2 is an enlarged sectional view embodying the invention of the collapsible steering column;

FIG. 3 is a section of the column taken along line 3—3 of FIG. 2;

FIG. 4 is an enlarged sectional view of the steering column of FIG. 1 after an impact load upon the steering wheel;

FIG. 5 is a sectional view of a second embodiment of the collapsible steering column; and FIG. 6 is a section taken along line 6—6 of FIG. 5.

DESCRIPTION OF THE PREFERRED EMBODIMENTS

Turning first to FIG. 1, the collapsible steering wheel column 10 includes a steering wheel 12 attached to an upper longitudinally extending member 14 which coacts with a lower longitudinally extending member 16 by telescopically sliding into the lower member 16. A rigid housing 18 encompasses the lower coacting member 16 which is journalled for rotation therein by a bearing 20 as best seen in FIG. 2. The housing 18 is secured to bracket 22 by a semicircular cap 24 with bolts 26. The bracket 22 attaches the steering column 10 to the vehicle body structure (not shown). The lower end of the coacting member 16 (also not shown) is coupled to a steering linkage assembly which responds in a conventional manner to turn the wheels of the vehicle.

Referring now to FIGS. 2 and 3, the upper coacting member 14 includes a radially outwardly facing annular recess 28 with a ramp surface 30, a generally square-shaped driving flange 32, inwardly adjacent to the annular recess 28, and a compacting conical lower portion 34 with a disc 36 threadably attached to its tip 38, all of which are at least partially disposed within the lower coacting member 16. The annular recess 28 borders the interface between the coacting members 14 and 16. The driving flange 32 mates with a square-shaped bore 40 within the lower coacting member 16 to provide a direct rotary coupling between the coacting members 14 and 16 so that a turn of the steering wheel 12 also rotates both coacting members 14 and 16. The disc 36 is slidably received in a circular bore 42 of the coacting member 16. Because the driving flange 32 and the disc 36 are widely spaced apart on the upper coacting member 14, together they provide longtitudinal stability to the upper coacting member 14 when it telescopes into the lower coacting member 16 during an axial impact force on the steering wheel 12.

The lower coacting member 16 includes a radially inwardly facing annular recess 44 which is opposite the annular recess 28. A resilient torus 46 is disposed in both annular recesses 28 and 44 of the coacting members 14 and 16, respectively, for retaining the members in a fixed axial disposition with respect to one another until the application of a disengaging impact force upon the steering wheel 12. Further, a shock-absorbing resilient pad 48 with a central opening 50 is backed by a plate 52 which also has a central opening 54. The pad 48 and the backing plate 52 are located at the bottom of the square bore 40 and both encircle a part of the conical lower portion 34 between the drive flange 32 and the disc 36.

In operation, as shown in FIG. 4, the upper coacting member 14 telescopically slides or collapses axially into the lower coacting member 16 under an impact force on the steering wheel 12 which disengages the retaining torus 46. The driving flange 32 and the disc 36 pilot the telescoping upper coacting member 14 as it collapses into the lower coacting member 16. The stiffness of the resilient torus 46 and the angle of the ramp surface 30 determine the amount of impact force which is necessary before the disengagement of the steering column 10 is accomplished by the axial and radial compression of the resilient torus 46. This feature has the advantage of permitting light impact forces during normal operating conditions to be absorbed without a premature collapsing of the steering column 10.

As the upper coacting member 14 slides downwardly, the energy of the impact is absorbed by the resilient pad 48 which is progressively compressed both axially and radially by the tapered conical lower portion 34 of the upper coacting member 14. The amount and rate of energy absorption is determined by the stiffness of the resilient pad 48 and the taper of the conical lower portion 34 of the upper coacting member 14. The taper of the conical lower portion 34 and the location of the backing plate 52 with its central opening 54 determines the amount of collapse of the upper coacting member 14 into the lower coacting member 16 before the conical portion 34 comes into contact with the central opening 54 which stops any further collapsing of the steering column 10.

The present invention is also concerned with the resettability of the steering column 10 for normal operation after it is once collapsed in an accident. This is accomplished by pulling the steering wheel 12 connected with the upper coacting member 14 outwardly which compresses the resilient torus 46 an amount sufficient to re-engage it in the annular recess 28 of the upper coacting member 14.

A second embodiment is shown in FIGS. 5 and 6 and is substantially similar to that previously described. The two differ primarily in that the drive means between the upper and lower coacting members 14 and 16 is accomplished by a splined drive member 56 in place of the disc 36 and the splined drive member 56 is nonrotatably attached to the end of the upper coacting member 14 by a key 58, washer 60, and cap screw 62. An internal splined mating bore 64 for the splined member 56 replaces the circular mating bore 42 of the disc 36. An annular flange 66 on the upper coacting member 14 closely mates with a circular bore 68 in the upper end of the lower coacting member 16 to replace the square driving flange 32. The widely spaced flange 66 and splined member 56 provide longitudinal stability to the upper coacting member when it collapses into the lower coacting member 16. The resilient retaining torus 46, the resilient energy-absorbing pad 48 and its backing plate 52 all function in a manner as previously described in the first embodiment.

I claim:

1. In an energy absorbing collapsible steering column for motor vehicles of the resettable type, a steering wheel drivingly connected to two longitudinally extending, telescopically slidable coacting members, a housing for rotatably receiving one of said coacting members and adapted to be supported by brackets attached to the frame of said vehicle, means for transferring the rotation of one coacting member to the other coacting member, the improvement comprising: means defining opposed annular recesses on said members at their interface; a first resilient means disposed within said annular recesses intermediate said coacting members for retaining said members in a fixed axial disposition with respect to one another until a predetermined disengaging impact load upon said steering wheel; a second resilient means within one of said coacting members for progressively absorbing the energy from said impact force; and a compacting means responsive to relative movement between said coacting members for compressing said second resilient means both axially and radially during an impact force to effect energy absorption, said coacting members being easily resettable to their normal fixed axial disposition with respect to one another by compressing said first resilient means both axially and radially in a direction opposite to the impact load in order to re-engage the first resilient means in the annular recesses of each coacting member; said second resilient means comprising an elastomeric pad having an aperture therein and said compacting means comprising a tapered conical portion receivable in said aperture.

2. An energy absorbing steering wheel column of the resettable type having a steering wheel drivingly connected to two longitudinally extending telescopically slidable coacting steering column members, and a tubular housing enclosing said coacting members for rotation therein, said column comprising: a first rotatable tubular member, said first member having a radially inwardly facing annular recess; a second rotatable member having a radially outwardly facing annular recess opposite said annular recess in the first member, said second member including a ramp surface adjacent the corresponding annular recess, a tapered conical portion and means extending radially outwardly into engagement with said first member for longitudinally stabilizing the telescopically slidable movement between said members and being at least partially disposed within said first member, said stabilizing means on said second member further forming a rotary drive coupling with said first member; a resilient torus, said torus being disposed in both said annular recesses for retaining the first and second members in a fixed axial disposition with respect to one another until the application of a disengaging impact force upon said second member; and a shock absorbing resilient pad with a backing plate being positioned within said second member and including a central opening for axially receiving said tapered conical portion whereby a load upon the steering column exceeding the predetermined impact force axially compresses and disengages the torus from said radially outwardly facing annular recess along said ramp surface and said stabilizing means pilots the second member into the first member so that the tapered conical portion progressively compresses both axially and radially the shock absorbing resilient pad, the collapsed coacting members being resettable to their normal fixed axial disposition before impact without special servicing tools by effecting relative axial movement between said members until said torus is retained in both said annular recesses.

3. In an energy absorbing collapsible steering column of the resettable type having a steering wheel, two rotatable and longitudinally extending coacting shafts, and a tubular housing with said coacting shafts rotatable therein, the improvement comprising: a telescopically slidable interface between said coacting shafts; means for establishing a direct rotary drive coupling between said coacting shafts, said coupling means also longitudinally stabilizing the telescopic slidable movement between said coacting shafts; a first resilient means intermediate said coacting shafts for retaining said steering column in an operational position up to a predetermined impact load before allowing said telescopic slidable movement; a compacting means for absorbing the energy from said impact load including a second resilient means intermediate said coacting shafts and a tapered conical portion on one of said shafts for progressively compressing both axially and radially said second resilient means to absorb the energy from said impact load.

4. An energy absorbing collapsible steering wheel column of the resettable type according to claim 3 wherein one shaft includes a non-circular bore and said rotary drive coupling means is a non-circular flange adjacent to said first resilient means slidably mated within said bore.

5. An energy absorbing collapsible steering wheel column of the resettable type according to claim 3 wherein said rotary drive coupling means comprises mating splined surfaces on said shafts.

6. An energy absorbing collapsible steering wheel column of the resettable type according to claim 3, wherein said longitudinal stabilizing means includes a flange and a disc spaced apart from the flange, said tapered conical portion being between the flange and disc.

7. An energy absorbing collapsible steering wheel column of the resettable type according to claim 3 wherein said first resilient means has a central bore and is compressed radially and axially by a ramp surface extending through said central bore during a disengaging impact force which then permits one of the coacting shafts to collapse into the other shaft, and the steering column can later be reset to an operating position by a similar compression of the first resilient means in a direction opposite to the collapsing direction.

* * * * *